UNITED STATES PATENT OFFICE.

WILLIAM McARTHUR, OF TENINO, WASHINGTON.

PLASTIC COMPOSITION.

1,274,726.     Specification of Letters Patent.     Patented Aug. 6, 1918.

No Drawing. Application filed May 8, 1917, Serial No. 167,316. Renewed March 12, 1918. Serial No. 222,045.

*To all whom it may concern:*

Be it known that I, WILLIAM MCARTHUR, a citizen of the United States, residing at Tenino, in the county of Thurston and State of Washington, have invented a new and useful Plastic Composition, of which the following is a specification.

This invention relates to a plastic composition for use in manufacture of brick, tile, sewer pipe, pottery and other articles ordinarily made of clay.

One of the objects of the present invention is to prepare a plastic composition which is light, fireproof, waterproof, and of considerable strength, it being possible to use the composition not only for the purposes mentioned but also as a plaster, as a floor covering, and for like purposes.

With the foregoing and other objects in view the invention consists of the following ingredients substantially in the proportions stated, said proportions being by volume:—

Tuff—50 parts,
Sodium silicate—12 parts,
Sodium chlorid—1 or 2 parts.

To fifteen (15) parts of the above mixture may be added one part of Portland cement and one part lime, although these additional ingredients are not necessary under all conditions.

In making the composition the tuff, which is a volcanic ash, is procured by blasting or in any desired manner, and is thoroughly roasted in suitable apparatus provided therefor, after which it is put through a crushing process so as to reduce it to a fine powder. Fifty (50) parts of this powder are mixed with the twelve (12) parts of sodium silicate so as to produce a thick paste or dough, and after these two ingredients have been throughly mixed a solution of sodium chlorid is added. These parts are then mixed thoroughly and afterward placed in molds or in any other containers. If desired, a suitable coloring matter can be added before the composition is molded.

After the molded composition has hardened, it is removed from its mold and put aside to dry.

When it is desired to make bricks from the composition the composition is first molded into bricks after which the bricks are placed in a furnace or kiln and heated to a high temperature for one or two hours.

When it is desired to use the composition as a floor covering it is reduced to a fine powder after the parts have been thoroughly mixed and this powder can be shipped in barrels or sacks. The composition is mixed with water and then spread over the floor in the same manner as plaster.

Where it is desired to give the composition considerable strength, cement and lime can be added thereto in the proportions stated.

What is claimed is:

1. A plastic composition including pulverized tuff, sodium silicate, sodium chlorid and Portland cement.

2. A plastic composition consisting of pulverized tuff, approximately 50 parts, sodium silicate approximately 12 parts, and sodium chlorid approximately 2 parts, combined with Portland cement and lime.

In testimony that I claim the foregoing as my own, I have hereto affixed my signature in the presence of two witnesses.

WILLIAM McARTHUR.

Witnesses:
H. P. SCHEEL,
P. C. KIBBE.

Copies of this patent may be obtained for five cents each, by addressing the "Commissioner of Patents, Washington, D. C."